March 25, 1924. 1,487,812
H. SCHREIER
CEMENT BRICKMAKING MACHINE
Filed Dec. 12, 1922    2 Sheets-Sheet 1
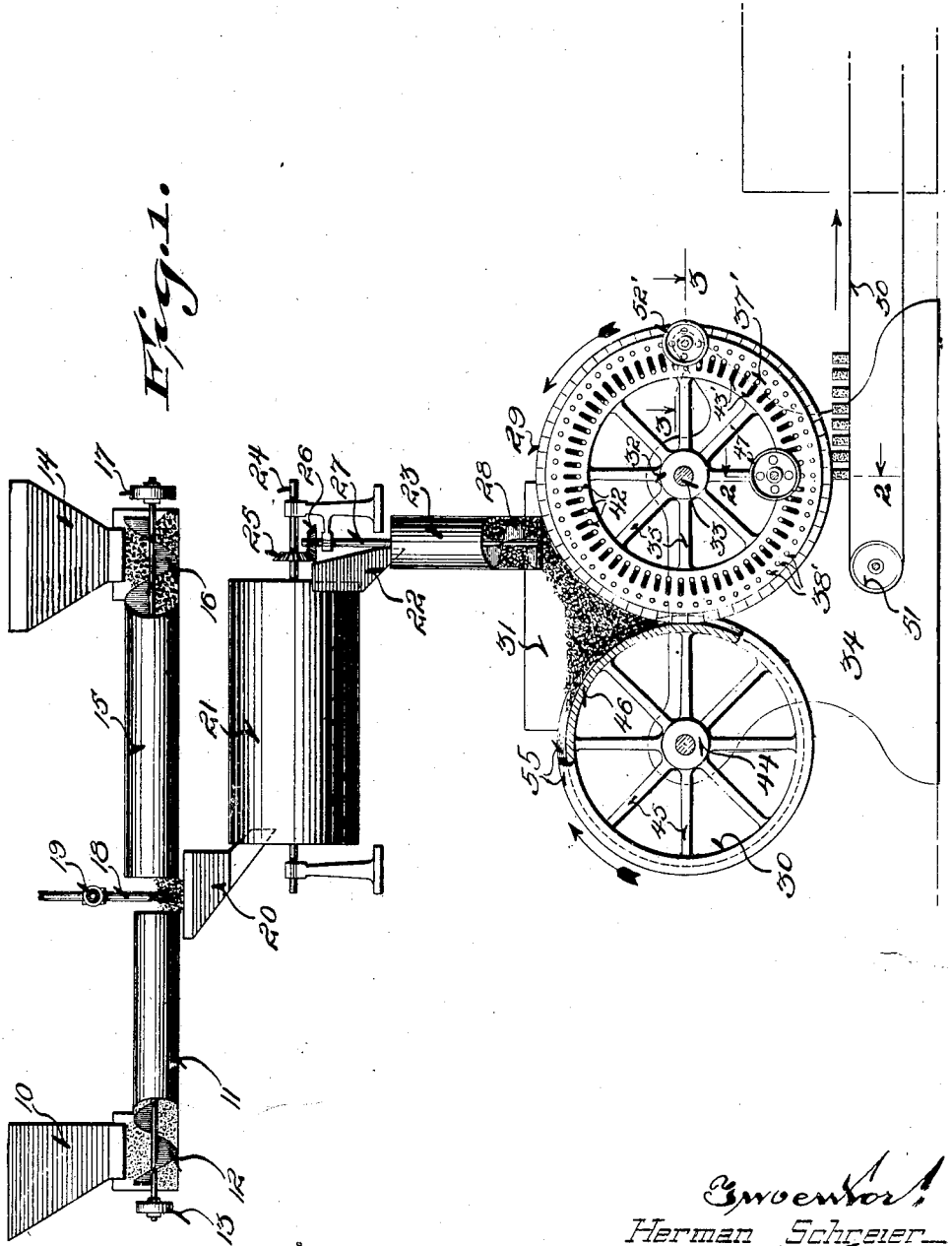

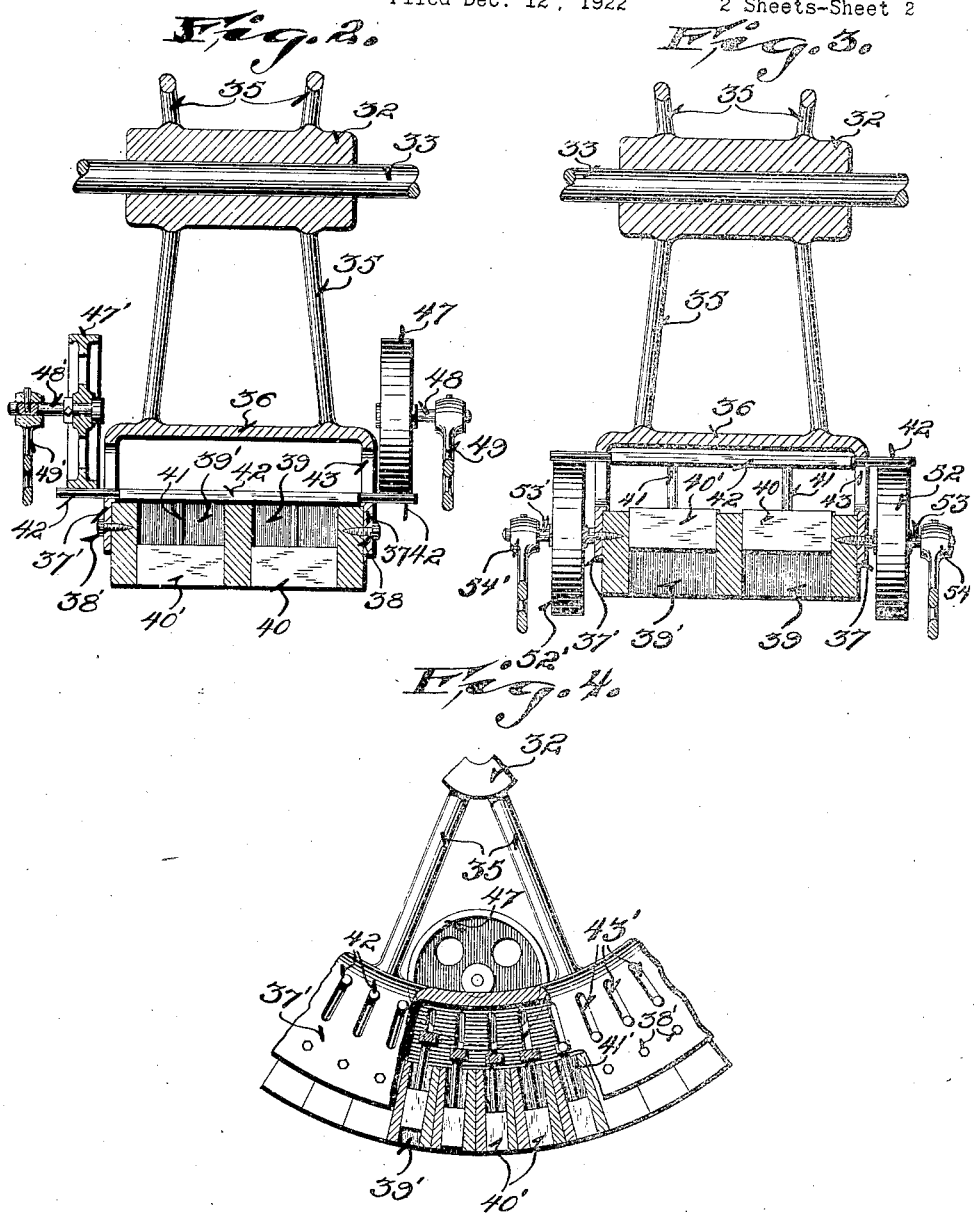

Patented Mar. 25, 1924.

1,487,812

UNITED STATES PATENT OFFICE.

HERMAN SCHREIER, OF SHEBOYGAN, WISCONSIN.

CEMENT BRICKMAKING MACHINE.

Application filed December 12, 1922. Serial No. 606,421.

*To all whom it may concern:*

Be it known that I, HERMAN SCHREIER, a citizen of the United States, and resident of Sheboygan, in the county of Sheboygan and State of Wisconsin, have invented certain new and useful Improvements in Cement Brickmaking Machines; and I do hereby declare that the following is a full, clear, and exact description thereof.

The invention relates to a process and apparatus for making cement bricks. Sand and cement are mixed together and suitably moistened and fed downwardly on the top of a moulding wheel provided with a plurality of moulds. A compression wheel is provided cooperating with the moulding wheel and forcing the cement into the moulds from which it is ejected in the form of bricks.

It is the object of the invention to provide a process and apparatus for producing cement bricks of such nature that the process is carried out automatically and in a rapid manner so that a maximum of out-put is had in a minimum of time, the method calling for but little expenditure of labor. The operation is substantially automatic from the time of introduction of the sand and cement to the emanation of the moulded brick. The mixing of materials is automatic and the formation of bricks in the moulding wheel is automatic and carried out with great rapidity.

An object of the invention is the provision of means especially efficient in the moulding of bricks. A compression wheel is provided which forces the material into the moulds, whence it is ejected by plungers. The action of the compression wheel is such as to force the material into every portion of the mould and a well formed brick results.

The object of the invention is the provision of moulding means which are especially simple in construction and operation. A series of moulds is disposed on the periphery of the moulding wheel and a plunger is actuated in each mould through the medium of an ejector rod contacting with an idle wheel. The plunger is actuated in a positive manner and the brick is ejected without breakage or malformation. Additional wheels are provided for the retraction of the plungers.

With the above and other objects in view, which will appear as the description proceeds, the invention resides in the novel construction, combination and arrangement of parts, substantially as hereinafter described and more particularly defined by the appended claims, it being understood that such changes in the precise embodiment of the herein disclosed invention may be made as come within the scope of the claims and in the described and defined novel processes.

In the accompanying drawing is illustrated one complete example of the physical embodiment of the machine of the present invention constructed according to the best mode so far devised for the practical application of the principles thereof, and in which:

Figure 1 is a diagrammatic view in side elevation illustrating the novel process and mechanism, part of the mould hopper being shown in section.

Figures 2 and 3 are sections on the lines 2—2 and 3—3, respectively, of Figure 1, and Figure 4 is a detail of a sector of the moulding wheel.

Cement is deposited through the hopper 10 into feed cylinder 11 through which it is forced by means of worm 12 operated by a suitable belt on the pulley 13, and sand is deposited through hopper 14 into feed cylinder 15 through which it is forced by means of worm 16 operated by pulley 17 on which rides a suitable belt. The sand and cement are deposited from cylinders 15 and 11 at adjacent ends in the cylinders, at which point steam or water may be fed to the material by means of pipe 18 controlled by valve 19. The material is then conveyed by chute 20 into mixer 21, which may be of any desired type, and thence the substance is fed to chute 22 whence it is deposited into feed cylinder 23. The mixer 21 may receive the mixing power in any desired way, as through shaft 24, which is provided with a gear 25 adapted to actuate the gear 26 on shaft 27 for rotating worm 28 in feed cylinder 23. The worm 28 and the action of gravity results in the forcing of the mixed cement downwardly upon the upper surface of mould wheel 29 which cooperates with a compression wheel 30, a hopper 31 being provided which overlies adjacent upper portions of the wheels and prevents the cement from falling off the wheels containing a supply of the material for feeding into the moulds.

The moulding wheel comprises a hub 32 rotating on a shaft 33 rotatably mounted on support 34. Support 34 is shown in Figure 1. A similar support is provided for the other side of the wheel, (not shown.) From hub 32 radial spokes 35 extend to cylinder 36, from which flanges 37—37' are outwardly directed. Disposed between the flanges and secured thereto by screws 38—38' are a series of pairs of moulds, the mould farther removed from the observer in Figure 1 being indicated by reference character 39, the nearer mould being indicated by reference character 39'. If desired, only a series of single moulds may be provided, or the number may be increased in excess of two. This construction provides individually removable moulds so that when one mould becomes worn it may be removed without disturbing other portions of the mould wheel.

In mould 39 a plunger 40 is reciprocable and a plunger 40' is similarly reciprocable in mould 39', the plunger rod 41 being provided for plunger 40 and a plunger rod 41' for plunger 40'. The plunger rods are rigid with an ejector bar 42 extending transversely and beyond the flanges 37—37'. A series of radial slots 43' are provided in flange 37' for the reception of adjacent ends of ejector bars 42 and a series of similar slots 43 are provided in flange 37 for the reception of the other ends of the bars.

The compression wheel comprises hub 44, spokes 45, cylinder 46 and bordering flanges 55 on either side of the cylinder. The flanges 55 are fitted so as to lie close to the walls of moulds 39—39' and on the rotation of the mould wheel, the material which has been deposited in the moulds by the action of feed cylinder 23 is compressed therein by cylinder 46, the two wheels rotating in opposite directions. The cement bricks are thus formed in the moulds, the compressing action being such as to force the material into every portion thereof.

When the bricks thus formed reach the lowermost point of travel of the mould wheel, the ends of ejector bar 42 encounter ejector wheels 47—47', rotating on shaft 48—48' carried by suitable supports 49—49'. The ends of the bars are moved outwardly in slots 43—43' and plungers 40—40' are thus operated to eject the bricks which are deposited on endless conveyor 50 riding on a roller 51. The further rotation of the wheel carries the moulds to retraction wheels 52—52' rotating on shaft 53—53' carried by suitable supports 54—54'. The action of retraction wheels 52—52' is to move the ejector bars towards shaft 33, the movement of the bars being limited by the dimension of the slots 43—43'.

After passing retraction wheels 52—52', the moulds are in condition for receiving material from feed cylinder 23.

Claims:—

1. A mould wheel comprising a cylinder, a pair of flanges outwardly directed therefrom, said flanges having radial slots therein, a series of moulds having radial bores therein, a plunger in each of said moulds, a plunger rod on each of said plungers, an ejector bar secured to said plunger rods, one end of said ejector bar extending through a slot in one of said flanges, the other end of said ejector bar extending through the slot in the other of said flanges, means cooperating with the ends of said ejector bar on the rotation of said wheel for moving said bar outwardly, and means cooperating with said ends of said ejector bar for moving said bar inwardly on the rotation of said mould wheel.

2. A moulding machine comprising a mould wheel having a plurality of pockets extending radially inwardly from its periphery, a plurality of plungers located within said pockets and having rods projecting inwardly of said mould wheel, a bar extending transversely through said mould wheel, a pair of rotary cam members adapted to contact with the ends of said bars to force said bars towards the periphery of said mould wheel, a pair of rotary cam members adapted to contact with the ends of said bars to force said bars towards the axis of said mould wheel, and a compression wheel cooperating with said mould wheel for forcing material into said mould wheel.

In testimony that I claim the foregoing I have hereunto set my hand at Milwaukee, in the county of Milwaukee and State of Wisconsin.

HERMAN SCHREIER.